United States Patent
Matsuyama (10) Patent No.: US 6,384,570 B2
(45) Date of Patent: May 7, 2002

(54) BATTERY PACK AND CHARGE CIRCUIT THEREFOR

(75) Inventor: Hirotsugu Matsuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/735,506

(22) Filed: Dec. 14, 2000

(30) Foreign Application Priority Data

Dec. 15, 1999 (JP) ............................................ 11-355343

(51) Int. Cl.[7] ............................ H02J 7/00; H01M 10/44
(52) U.S. Cl. .......................... 320/101; 320/112; 307/48; 307/150
(58) Field of Search ................................. 320/101, 145, 320/162; 307/18, 19, 20, 46, 48, 150; 328/107, 112

(56) References Cited

U.S. PATENT DOCUMENTS

| | | | | |
|---|---|---|---|---|
| 5,442,274 A | * | 8/1995 | Tamai | ........................ 320/146 |
| 5,710,506 A | * | 1/1998 | Broell et al. | ................. 320/145 |
| 5,936,380 A | * | 8/1999 | Parrish | ........................ 320/101 |
| 6,084,379 A | * | 7/2000 | Buniatyan | ................... 320/101 |

FOREIGN PATENT DOCUMENTS

JP    8-107581    4/1996    ............ H04Q/7/32

* cited by examiner

*Primary Examiner*—Gregory Toatley
(74) *Attorney, Agent, or Firm*—Whitham, Curtis & Christofferson P.C.

(57) ABSTRACT

A battery pack comprises a solar panel, a battery, a connector, and a charge/discharge circuit. The solar panel converts light energy into electric energy. The battery is charged with the electric energy from the solar panel. The connector supplies the electric energy to a portable terminal device. The charge/discharge circuit supplies the electric energy from the solar panel to the connector, and supplies the electric energy from the battery to the connector or charges the battery with part of the electric energy from the solar panel, in accordance with the amount of electric energy to be used by said portable terminal device, while the portable terminal device is in operation.

20 Claims, 5 Drawing Sheets

BATTERY PACK AND CHARGE CIRCUIT THEREFOR

BACKGROUND OF THE INVENTION

1. Field of the Invention

The present invention relates to a battery pack and a charge circuit for the battery pack, more particularly to a battery pack for supplying electric energy to a portable terminal device and a charge circuit for the battery pack.

2. Description of the Related Art

A portable terminal device such as a cellular phone, a PDA (Personal Data Assistant), and a notebook PC (Personal Computer) uses a rechargeable battery, for example, a lithium-ion secondary battery. Such battery packs release the devices from being wired, that is performances are available even if the device is outdoors where an outlet is unavailable.

Since such the battery packs are rechargeable by a charge circuit with, for example, an AC adapter which interconnects an outlet and the battery pack, the performance of the device is sustainable by recharging the battery pack.

However, long-time use of the device outdoors exhausts the battery pack, and the exhausted battery pack no longer activates the device until it recharged. Since recharging is the user's task, battery storage may occur if the user forgets recharging.

Unexamined Japanese Patent application KOKAI Publication No. H8-107581 discloses a technique for solving the above problems. This reference discloses a wireless telephony device comprising a solar panel which charges a secondary battery for activating the device.

The solar panel disclosed in Unexamined Japanese Patent Application KOKAI Publication No. H8-107581 is designed for supplying energy only to a liquid crystal display panel. If electric energy supplied by the solar panel is larger than electric energy necessary for driving the display panel, it has surplus energy which is unused. That is, energy sufficiency is not good. Especially, in case of a wireless telephone which requires less electric energy (less power consumption) for driving its liquid crystal panel, more surplus energy is unused.

The technique disclosed in Unexamined Japanese Patent Application KOKAI Publication No. H8-107581 is suitable for a device such as a wireless telephone whose display (LCD) is not required to be seen while the device is used. That is, it is not suitable, for example, for a notebook PC whose LCD panel (display) is required to be seen while the device is used.

In a case where a device has been unused for a long time, a user generally uninstalls a battery pack from the device to store it. In this case, if the detached battery has a residual energy, the battery pack will lose its capacity performance.

SUMMARY OF THE INVENTION

The present invention has been made in consideration of the above, it is an object of the present invention to provide a battery pack and a charge circuit therefor which use electric energy from a solar panel efficiently, thus extending life of battery installed in an equipment (portable terminal device) for longer usage.

It is another object of the present invention to provide a battery pack and a charge circuit therefor which are helpful for storing uninstalled battery pack for a long time with reducing deterioration of capacity performance of the battery.

To achieve the above described objects, a battery pack according to a first aspect of the present invention is a battery pack for supplying electric energy to a portable terminal device, comprises:

a solar panel unit which converts light energy into electric energy;

a battery which is rechargeable with the electric energy;

an interface between the battery pack and the portable terminal device which supplies the electric energy to the portable terminal device;

an energy supplier being connected to the solar panel unit, the battery and the interface, which supplies the electric energy from the solar panel unit to the interface when the portable terminal device is in operation, while supplying the electric energy from the battery to the interface or charging the battery with part of the electric energy from the solar panel unit in accordance with the amount of electric energy to be used by the portable terminal device.

According to the above structure, the solar panel unit converts light energy into electric energy, and supplies it to the energy supplier. When the portable terminal device is resting, the battery is charged with the electric energy supplied to the energy supplier. Accordingly, the battery is automatically charged with the electric energy from the solar panel unit. As a result, battery life extends, thus the portable terminal device can be used for a longer time. When the portable terminal device is in operation, the electric energy from the solar panel unit is supplied to the portable terminal device, at the same time the portable terminal device uses the electric energy charged in the battery as additional energy or the battery is charged, in accordance with the amount of electric energy to be used by the portable terminal device. As a result, the electric energy from the solar panel unit is used efficiently.

The solar panel may comprise: solar cells; and an external power supply interface which supplies the electric energy generated by the solar cells to the energy supplier.

The external power supply interface may accept connection with an AC adapter which obtains commercial electric energy.

The energy supplier may supply the electric energy from the AC adapter when the portable terminal device is in operation, while supplying the electric energy from the battery to the interface or charging the battery with part of the electric energy from the AC adapter in accordance with the amount of electric energy to be used by the portable terminal device. In this case, the electric energy from the AC adapter is supplied to the portable terminal device, at the same time, the portable terminal device uses the electric energy charged in the battery as additional energy or the battery is charged, in accordance with the amount of electric energy to be used by the portable terminal device.

The battery pack may further comprise a regulator between the solar cells and the external power supply interface. If the voltage regulated by the regulator is set to a voltage higher than the voltage supplied by the AC adapter, priority is given to the electric energy from the solar panel unit, thus, the electric energy from the solar panel unit is used efficiently.

The battery pack may further comprise a discharge circuit which arbitrarily discharge residual energy in the battery. This structure is helpful for restricting deterioration of capacity performance of the battery.

The energy supplier may comprise:

a variable resistance element which transmits the electric energy supplied from the solar panel unit to the interface; and a controller circuit which controls residence of the variable resistance element, the controller circuit controls the residence of the variable resistance element so that the battery is charged with a constant charge current. According to this structure, the battery is charged with the electric energy from the solar panel unit.

The variable resistance element may comprise a MOSFET whose one end of a current path is connected to the external power supply interface via an anti-reverse circuit, the other end of the current path is connected to the interface, and a gate is connected to the controller circuit, The controller circuit may control a voltage to be applied to the gate of the MOSFET so that a constant electric current flows in the battery while the battery is being charged. According to this structure, the battery is charged with a constant charge current.

The controller circuit may be activated by the electric energy supplied from the external power supply interface.

The battery may be substantially connected to a resistance element in series.

The controller circuit may measure voltage drop at the resistance element, and may control a voltage to be applied to the gate of the MOSFET so as to regulate the voltage drop to be constant.

A charge circuit according to a second aspect of the present invention is a circuit for charging a battery for a portable terminal device, comprises:

a controller which controls electric energy from a solar panel unit;

a transistor which is activated and inactivated under a control of the controller; and a current detector resistance element which detects electric current flowing through the battery, wherein the controller activates the transistor to supply electric currents to the battery and the current detector resistance element, and controls the transistor to be activated or inactivated so that a voltage between both ends of the current detector resistance element is regulated, thus the battery is charged with the electric energy supplied to the controller, while the portable terminal device is resting, and the controller activates the transistor to supply the electric energy from the solar panel unit to the portable terminal device, and supplies the electric energy from the battery to the portable terminal device or charges the battery with part of the electric energy from the solar panel unit, in accordance with the amount of electric energy to be used by the portable terminal device, while the portable terminal device is in operation.

According to this structure, the battery is charged with the electric energy from the solar panel while the portable terminal device is resting, thus, the portable terminal device can be used for a longer time. When the portable terminal device is in operation, the electric energy from the solar panel is supplied to the portable terminal device, at the same time, the portable terminal device uses the electric energy charged in the battery as additional energy or the battery is charged, in accordance with the amount of electric energy to be used by the portable terminal device. As a result, the electric energy from the solar panel is used efficiently.

The transistor may be connected to an interface which accepts an external power source, an anode of the battery, and the controller, and one end of the current detector resistance element may be connected to a cathode of the battery and the controller, and the other end of the current detector resistance element is grounded.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

An embodiment of the present invention will now be described with reference to FIGS. 1 to 5.

Figure 1:
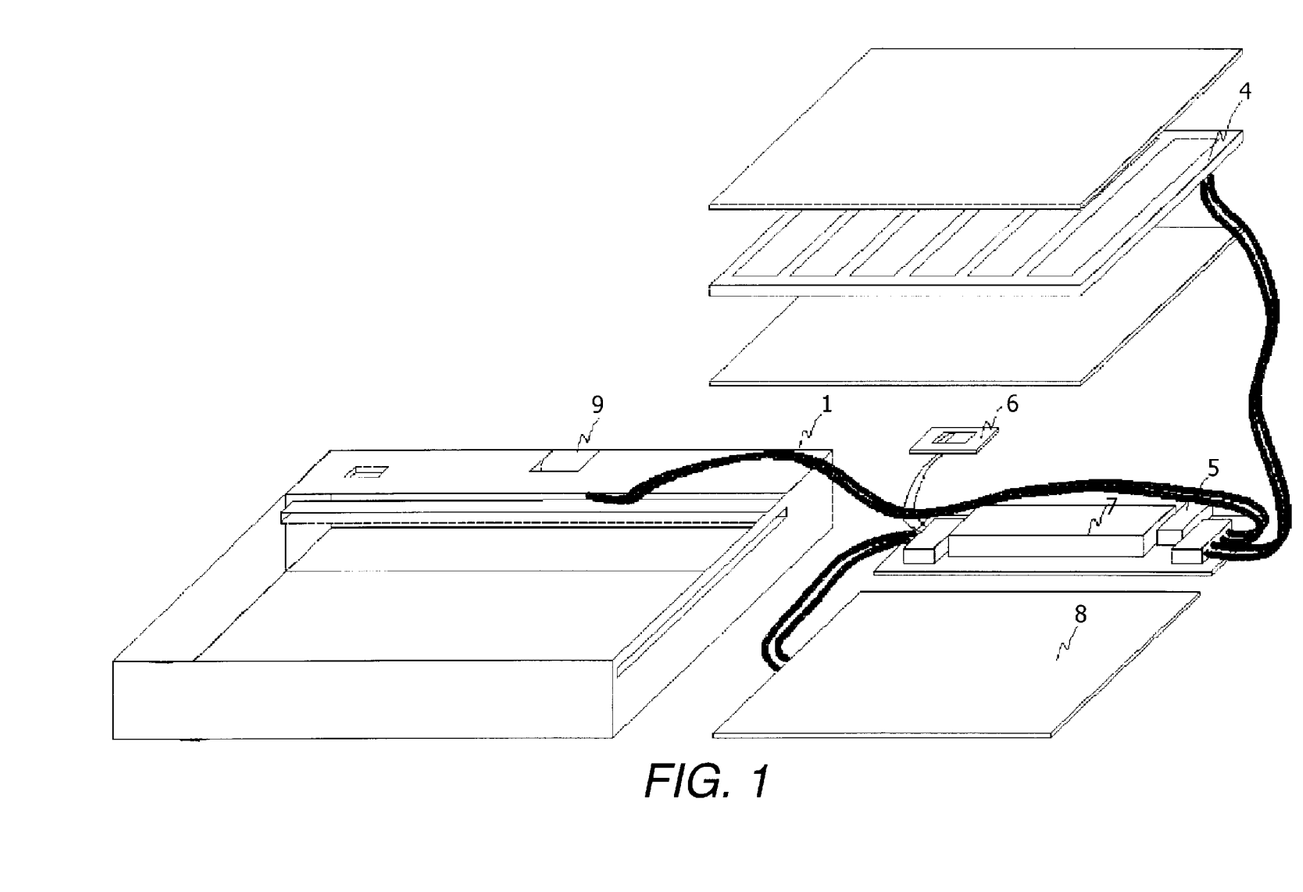
FIG. 1 is a perspective view showing sections of a battery pack according to an embodiment of the present invention.
Figure 2:
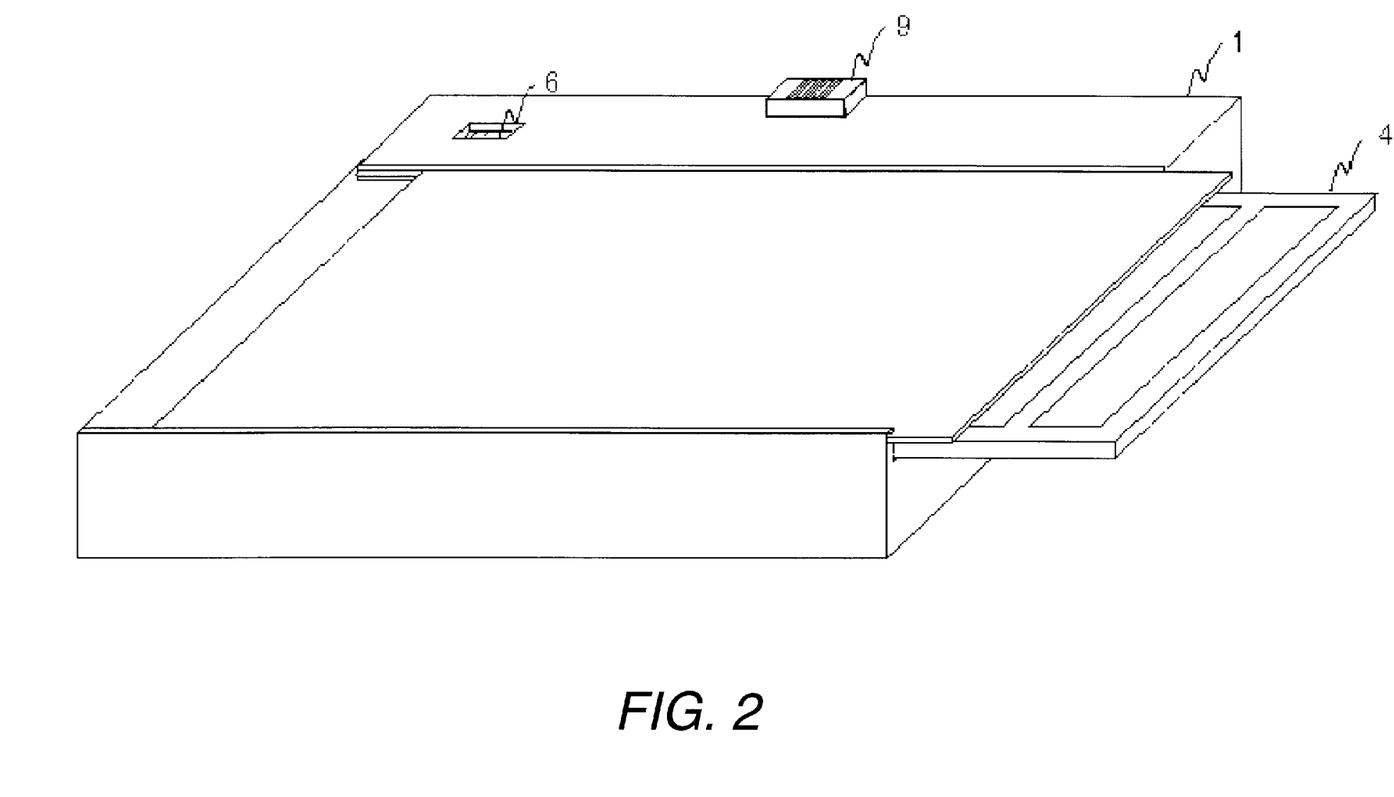
FIG. 2 is a perspective view showing the battery pack according to the embodiment of the present invention.
Figure 3:
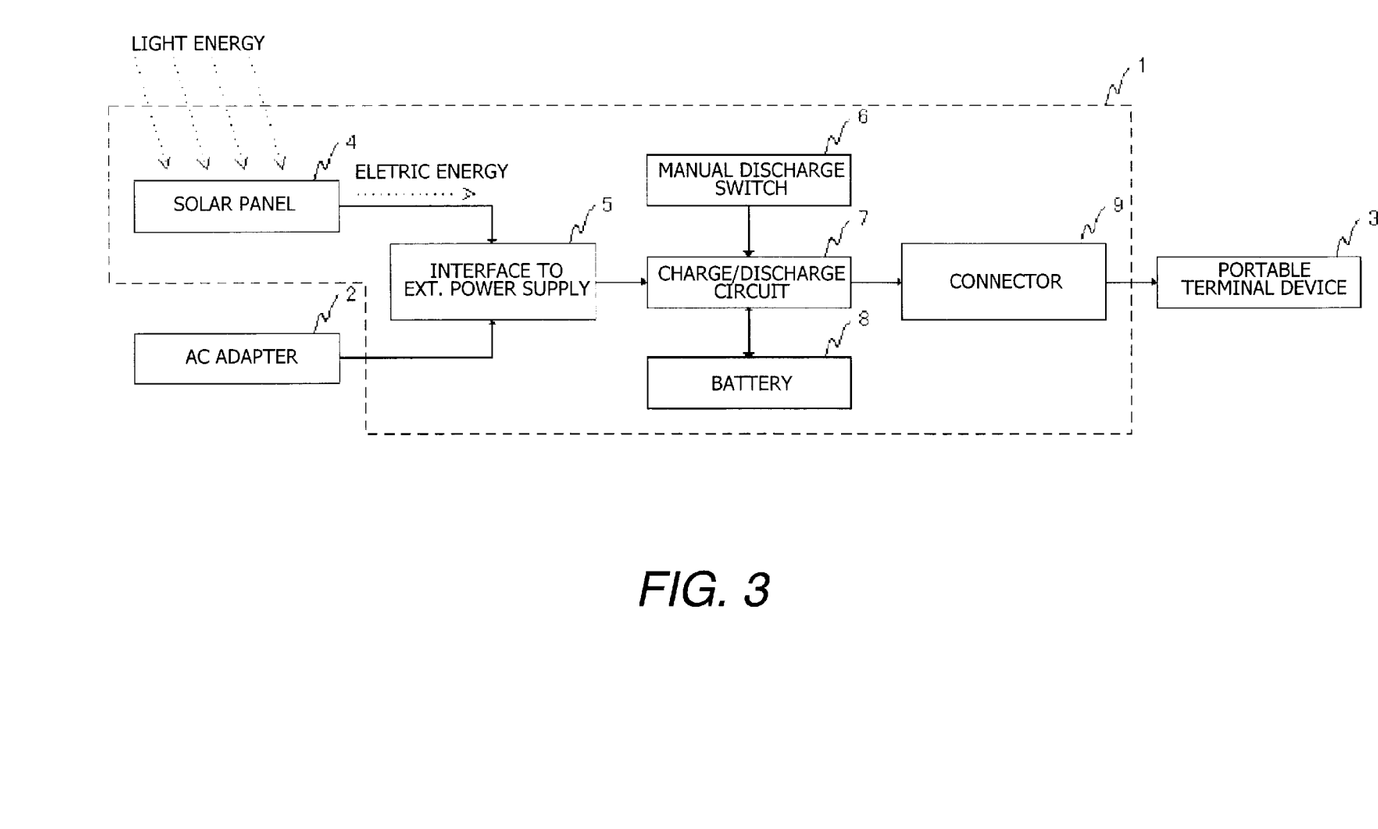
FIG. 3 is a block diagram exemplifying the structure of the battery pack according to the embodiment of the present invention.

FIG. 1 is a perspective view showing sections of a battery pack according to this embodiment. FIG. 2 is a perspective view showing the battery pack (completed). FIG. 3 is a block diagram exemplifying the structure of the battery pack.

As shown in FIGS. 1 and 2, a battery pack 1 has rectangular-like shape and comprises a solar panel 4, an external power supply interface 5, a charge/discharge circuit 7, a manual discharge switch, a battery 8, and a connector 9.

The solar panel 4 comprises solar cells which converts light energy into electric energy. The solar panel 4 is detachably housed in the battery pack 1. A light-transmittable plate covers the surface of the solar panel 4. The solar panel 4 is connected to the external power supply interface 5.

As shown in FIG. 3, the external power supply interface 5 being connected to the solar panel 4 is designed so as to accept connection with an AC adapter 2. The external power supply interface 5 is also connected to the charge/discharge circuit 7 so as to supply electric energy from the solar panel 4 and the AC adapter 2 to the charge/discharge circuit 7.

The charge/discharge circuit 7 is connected to the connector 9. The connector 9 interconnects the battery pack 1 and a portable terminal device 3, thus, electric energy from the charge/discharge circuit 7 is supplied to the portable terminal device 3.

Figure 4:
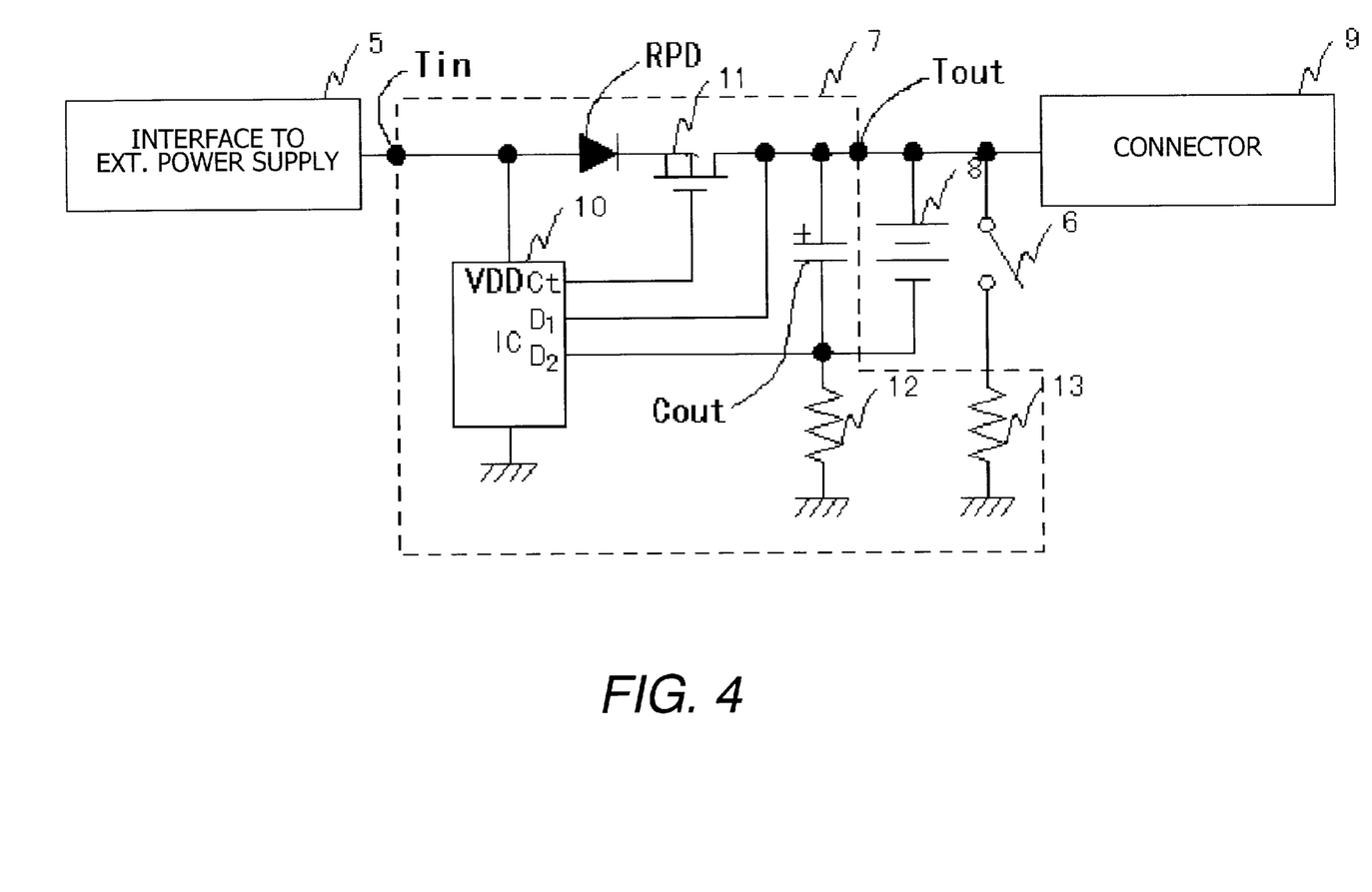
FIG. 4 is a block diagrams showing a charge/discharge circuit of the battery pack according to the embodiment of the present invention.

FIG. 4 is a block diagram showing the charge/discharge circuit 7 in detail. As shown in FIG. 4, the charge/discharge circuit 7 comprises a controller IC 10, a MOSFET (Metal Oxide Semiconductor Field Effect transistor: p-channel) 11, a current detector resistance element 12, and a discharge lord 13.

An output terminal of the external power supply interface 5 is connected to a source of the MOSFET 11 via an input terminal Tin of the charge/discharge circuit 7 and an anti-reverse diode RPD. A drain of the MOSFET 11 is connected to a power source terminal of the connector 9 via an output terminal Tout of the charge/discharge circuit 7.

A smoothing capacitor Cout and a voltage detector resistance element 12 are connected in series between drain and ground of the MOSFET 11. The discharge resistance element 13 is arranged so that one end thereof is grounded for restricting current flow.

A power source end VDD of the controller IC 10 is connected to an input terminal Tin of the charge/discharge circuit 7. A voltage controller terminal Ct of the controller IC 10 is connected to a gate of the MOSFET 11. Activation or inactivation of the MOSFET 11 depends on a voltage to be applied to the gate of the MOSFET 11 under control of the controller IC 10.

A voltage detector terminal D1 of the controller IC 10 is connected to the drain of the MOSFET 11, and detects a voltage at the drain. Another voltage detector end D2 is connected to a node between the current detector resistance element 12 and the smoothing capacitor Cout. The controller IC 10 detects the voltages at those points.

The portable terminal device 3 supplies its status indicator signal which represents status (ON or OFF) of the portable terminal device 3 to the controller IC 10. The status indicator signal is, for example, kept at high level when the portable terminal device 3 is in operation, while being kept at low level by a pull-down resistance element when the portable terminal device 3 is in the other phases.

As shown in FIG. 4, an anode of the battery 8 is connected to the output terminal Tout of the charge/discharge circuit 7, while a cathode is connected to a node between a negative pole of the smoothing capacitor and the voltage detector resistance element 12.

One end of the manual discharge switch 6 is connected to the anode of the battery 8, while the other end is connected to the other end (ungrounded) of the discharge resistance element 13. If the manual discharge switch 6 is turned on, residual energy in the battery 8 is discharged to the ground via the discharge resistance element 13.

Operations of thus structured battery pack 1 will now be described.

A case where the portable terminal device 3 is resting will now be described first.

When the solar panel 4 receives lights, it converts light energy into electric energy. The electric energy is supplied to the power source terminal VDD of the controller IC 10 via the external power source interface 5 and the input terminal Tin of the charge/discharge circuit 7. The supplied electric energy activates the controller IC 10. The activated controller IC 10 outputs a gate voltage at the voltage controller terminal Ct in order to activate the MOSFET 11. Thus, the electric energy supplied from the external power supply interface 5 is supplied to the battery 8 and the connector 9 via the anti-reverse diode RPD and the MOSFET 11. Because the portable terminal device 3 is resting, however, the current does not flow at the connector 9 while it is flowing through the battery 8 and the current detector resistance element 12.

The controller IC 10 is notified by the status indicator signal that the portable terminal device 3 is resting, and controls activation/inactivation of the MOSFET 11 by regulating the voltage detected by the voltage detector terminal D2, that is, the voltage between both ends of the current detector resistance element 12. For example, if the voltage between the both ends of the current detector resistance element 12 is larger than a reference, the controller IC 10 increases the voltage to be applied to the gate of the MOSFET 11 to increase the resistance of a current path in the MOSFET 11. As a result, the voltage between the both ends of the current detector resistance element 12 is reduced and regulated. On the contrary, if the voltage between the both ends of the current detector resistance element 12 is lower than the reference, the controller IC 10 decreases the voltage to be applied to the gate of the MOSFET 11 to decrease the resistance of the current path in the MOSFET 11. As a result, the voltage between the both ends of the current detector resistance element 12 is increased and regulated. Accordingly, the battery 8 is charged with a constant charge current.

Another case where the portable terminal device 3 is in operation will now be described.

As aforementioned, the electric energy converted by the solar panel 4 is supplied to the controller IC 10 from the external power source interface 5. Then, the controller IC 10 activates the MOSFET 11. The electric energy is then supplied to the connector 9 via the anti-reverse diode RPD, the current path in the activated MOSFET 11, and the output terminal Tout, and finally reaches the portable terminal device 3. Thus supplied electric energy will be used for operations in the portable terminal device 3.

In a case where the electric energy supplied from the solar panel 4 is less than the power consumption of the portable terminal device 3 (that is, electric energy shortage), the voltage to be supplied to the portable terminal device 3 is reduced. To compensate the shortage, the battery 8 supplies its electric energy to the portable terminal device 3 via the connector 9. At that time, polarity of a voltage at one end of the current detector resistance element 12 becomes negative. The controller IC 10 has detected that the portable terminal device 3 has been in operation based on the status indicator signal, and further detects a negative voltage at the voltage detector terminal D2. And the controller IC 10 activates under saturation in order to supply full power of the electric energy from the solar panel 4 to the portable terminal device 3. Thus, the portable terminal device 3 mainly uses the electric energy from the solar panel 4, and uses the electric energy from the battery 8 supplementary.

On the contrary, in a case where the electric energy from the solar panel 4 is more than the power consumption of the portable terminal device 3 (oversupply), electric current corresponding to surplus energy flows through the battery 8 and the current detector resistance element 12. In this case, the controller IC 10 controls activation/inactivation of the MOSFET 11 so that a voltage between the both ends of the current detector resistance element 12 is regulated, that is, a charge current to the battery 8 is regulated. According to this control, the battery 8 is charged with the electric energy being supplied to the controller IC 10. As a result, the electric energy supplied from the solar panel 4 is shared by the portable terminal device 3 and the battery 8. In other words, the battery 8 is charged with surplus electric energy of the solar panel 4, thus, efficient energy usage is realized.

A case where the AC adapter 2 is connected to the external power supply interface 5 will now be described.

When the AC adapter 2 is connected to the external power supply interface 5, electric energy from the solar panel 4 and the AC adapter 2 is supplied to the charge/discharge circuit 7 (controller IC 10). The controller IC 10 uses the supplied electric energy to turn on the MOSFET 11.

If the portable terminal device 3 is resting, the controller IC 10 supplies electric currents to the battery 8 and the current detector resistance element 12. The controller IC 10 also controls activation/inactivation of the MOSFET 11 so that a voltage between the both ends of the current detector resistance element 12 is regulated. As a result, the battery 8 is charged with constant charge current. The electric energy supplied from the AC adapter 2 is generally larger than the electric energy from the solar panel 4, therefore, the battery 8 is charged quickly in this case.

If the portable terminal device 3 is in operation, the controller IC 10 supplies the electric energy to the portable terminal device 3 via the connector 9. The portable terminal device 3 uses the supplied electric energy to execute operations. The electric energy from the AC adapter 2 is generally larger than energy necessary for executing the operations of the portable terminal device 3, therefore, the battery 8 may be charged with surplus electric energy.

To store the battery pack 1 for a long time after uninstalling it from the portable terminal device 3, the AC adapter should be disconnected from the external power supply interface 5 with shading of the solar panel 4. The manual discharge switch 6 connected to the charge/discharge circuit 7 should be turned on to discharge residual energy in the battery 8 to the ground via the discharge resistance element 13. That is, the manual discharge switch 6 allows a user to arbitrarily discharge the residual energy in the battery 8 with a simple action, so as to restrain deterioration of the capacity performance of the battery pack 1.

In a case where the solar panel 4 is detached from the battery pack 1 and the AC adapter 2 is also disconnected therefrom, the electric energy in the battery 8 is supplied to the portable terminal device 3. Or, in a case where the solar panel 4 is detached from the battery pack 1 while the AC adapter 2 is being connected thereto, the electric energy from the AC adapter 2 is supplied to the portable terminal device 3 while the battery 8 is being charged.

According to the above described embodiment, the structure wherein the battery pack 1 comprises the solar panel 4 which converts light energy into electric energy, allows the battery 8 to be charged even if the portable terminal device 3 is outdoors where no outlet is available. According to this feature, the portable terminal device 3 is able to be used for a longer time, because the portable terminal device 3 can use supplemental electric energy in addition to the battery 8.

When the portable terminal device 3 is in operation, the electric energy from the solar panel 4 is supplied to the portable terminal device 3 via the connector 9. Especially, in a case where the electric energy from the solar panel 4 is larger than the power consumption of the portable terminal device 3, the battery 8 is charged with surplus electric energy. Accordingly, the electric energy from the solar panel 4 is used efficiently.

According to the above embodiment, it is able to discharge the residual energy in the battery 8 easily by just operating the manual discharge switch 6. This is helpful for store the uninstalled battery pack 1 for a long time without deteriorating the capacity performance.

According to the above embodiment, the external power supply interface 5 is designed to accept connection with the AC adapter 2. This structure realizes not only quick charging but also charging under the portable terminal device is in operation.

Figure 5:
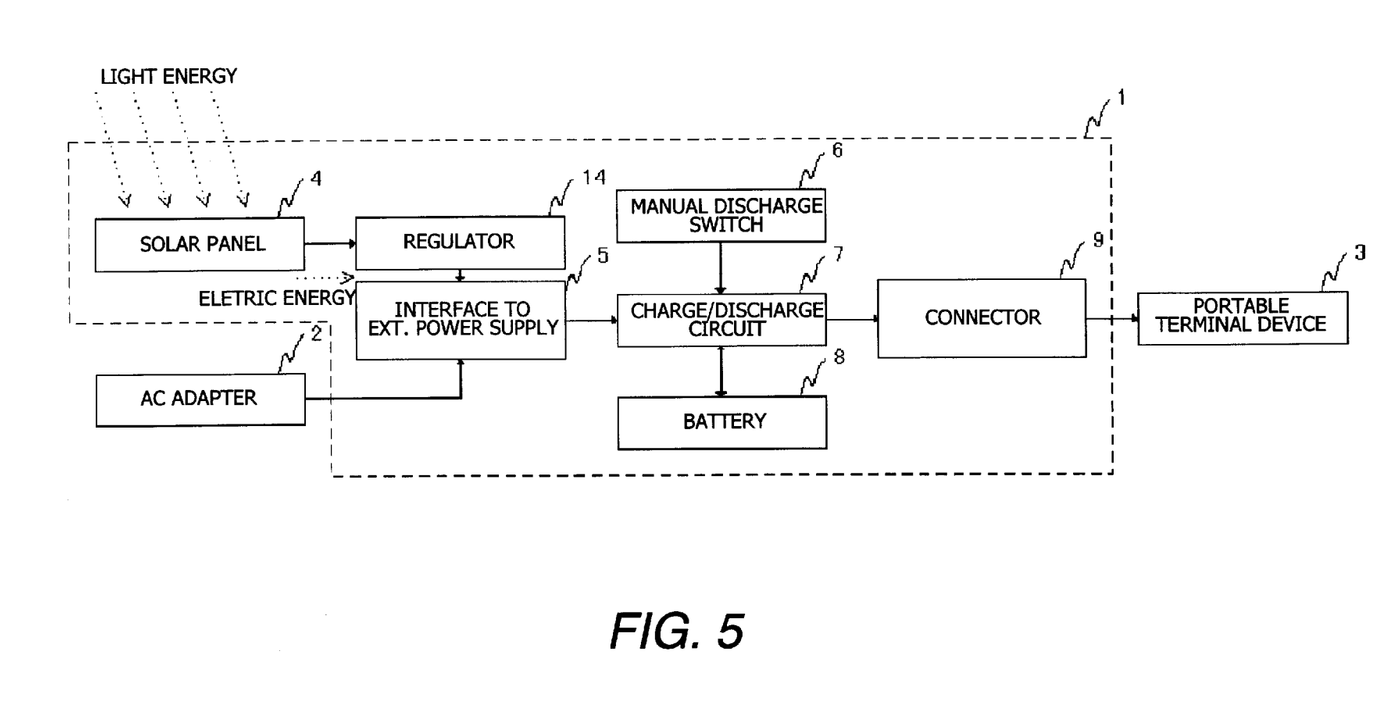
FIG. 5 is a block diagram showing the structure of a battery pack according to another embodiment of the present invention.

The structure of the present invention is not limited to the above exemplified structure. For example, a regulator 14 may be prepared between the solar panel 4 and the external power supply interface 5, as shown in FIG. 5. In this case, the regulator 14 regulates a voltage from the solar panel 4 so as to be constant. For example, if the voltage to be regulated is set to voltage higher than the voltage supplied by the solar panel 4, energy supply from the solar panel 4 priors to energy supply from the AC adapter 2. This structure helps to use the electric energy from the solar panel 4 efficiently. On the contrary, if the voltage to be regulated is set to voltage lower than the voltage supplied by the solar panel 4, energy supply from the AC adapter 2 priors to the energy supply from the solar panel 4. This structure is helpful for quick charging.

The external power supply interface 5 may be designed so as not to accept the connection with the AC adapter 2. According to this structure, the structure of the battery pack 1 is simplified. This structure may be applicable to a case where the electric energy from the solar panel 4 is always larger than the power consumption of the portable terminal device 3, thus, the energy supply by the AC adapter 2 is unnecessary.

The solar panel 4 may have a flexible stay by which the direction and angle of the solar panel is adjustable. This structure allows the solar panel 4 to face the light source by adjusting the direction and angle of the solar panel 4 in accordance with light incident angle. As a result, the solar panel 4 can receive light efficiently.

Features of the manual discharge with easy operation may be realized by arbitrary structures. In other words, the structure is not limited to the exemplified one comprising the manual discharge switch 6 and the discharge resistance element 13.

Instead of the MOSFET 11, a bipolar transistor or a variable resistance element may be applicable. Moreover, arbitrary structures for detecting the current flow in the battery 8 may be applicable. Further, a known technique such as P, PI and PID may be applicable in order to control the gate voltage of the MOSFET 11.

The portable terminal device 3 according to the above embodiments may be a cellular phone, a PDA (Personal Data Assistants), a notebook PC (Personal Computer), and the like.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. H11-355343 filed on Dec. 15, 1999 and including specification, claims, drawings and summary. The disclosure of the above Japanese Patent Application is incorporated herein by reference in its entirety.

What is claimed is:

1. A battery pack for supplying electric energy to a portable terminal device, comprising:
   a solar panel unit which converts light energy into electric energy;
   a battery which is rechargeable with the electric energy;
   an interface between said battery pack and said portable terminal device which supplies the electric energy to said portable terminal device;
   an energy supplier being connected to said solar panel unit, said battery and said interface, which supplies the electric energy from said solar panel unit to said interface when said portable terminal device is in operation, while supplying the electric energy from said battery to said interface or charging said battery with part of the electric energy from said solar panel unit in accordance with the amount of electric energy to be used by said portable terminal device.

2. The battery pack according to claim 1, wherein said solar panel comprises: solar cells; and an external power supply interface which supplies the electric energy generated by said solar cells to said energy supplier.

3. The battery pack according to claim 2, wherein said external power supply interface accepts connection with an AC adapter which obtains commercial electric energy, said energy supplier supplies the electric energy from said AC adapter when said portable terminal device is in operation, while supplying the electric energy from said battery to said interface or charging said battery with part of the electric energy from said AC adapter in accordance with the amount of electric energy to be used by said portable terminal device.

4. The battery pack according to claim 2 further comprising a regulator between said solar cells and said external power supply interface.

5. The battery pack according to claim 1 further comprising a discharge circuit which arbitrarily discharge residual energy in said battery.

6. The battery pack according to claim 2 further comprising a discharge circuit which arbitrarily discharge residual energy in said battery.

7. The battery pack according to claim 1, wherein said energy supplier comprises:
- a variable resistance element which transmits the electric energy supplied from said solar panel unit to said interface; and
- a controller circuit which controls residence of said variable resistance element, said controller circuit controls the residence of said variable resistance element so that said battery is charged with a constant charge current.

8. The battery pack according to claim 2, wherein said energy supplier comprises:
- a variable resistance element which transmits the electric energy supplied from said solar panel unit to said interface; and
- a controller circuit which controls residence of said variable resistance element, said controller circuit controls the residence of said variable resistance element so that said battery is charged with a constant charge current.

9. The battery pack according to claim 5, wherein said energy supplier comprises:
- a variable resistance element which transmits the electric energy supplied from said solar panel unit to said interface; and
- a controller circuit which controls residence of said variable resistance element, said controller circuit controls the residence of said variable resistance element so that said battery is charged with a constant charge current.

10. The battery pack according to claim 7, wherein said variable resistance element comprises a MOSFET whose one end of a current path is connected to said external power supply interface via an anti-reverse circuit, the other end of the current path is connected to said interface, and a gate is connected to said controller circuit, said controller circuit controls a voltage to be applied to the gate of said MOSFET so that a constant electric current flows in said battery while said battery is being charged.

11. The battery pack according to claim 8, wherein said variable resistance element comprises a MOSFET whose one end of a current path is connected to said external power supply interface via an anti-reverse circuit, the other end of the current path is connected to said interface, and a gate is connected to said controller circuit, said controller circuit controls a voltage to be applied to the gate of said MOSFET so that a constant electric current flows in said battery while said battery is being charged.

12. The battery pack according to claim 9, wherein said variable resistance element comprises a MOSFET whose one end of a current path is connected to said external power supply interface via an anti-reverse circuit, the other end of the current path is connected to said interface, and a gate is connected to said controller circuit, said controller circuit controls a voltage to be applied to the gate of said MOSFET so that a constant electric current flows in said battery while said battery is being charged.

13. The battery pack according to claim 7, wherein said controller circuit is activated by the electric energy supplied from said external power supply interface, said battery is substantially connected to a resistance element in series, said controller circuit measures voltage drop at said resistance element, and controls a voltage to be applied to the gate of said MOSFET so as to regulate the voltage drop to be constant.

14. The battery pack according to claim 8, wherein said controller circuit is activated by the electric energy supplied from said external power supply interface, said battery is substantially connected to a resistance element in series, said controller circuit measures voltage drop at said resistance element, and controls a voltage to be applied to the gate of said MOSFET so as to regulate the voltage drop to be constant.

15. The battery pack according to claim 9, wherein said controller circuit is activated by the electric energy supplied from said external power supply interface, said battery is substantially connected to a resistance element in series, said controller circuit measures voltage drop at said resistance element, and controls a voltage to be applied to the gate of said MOSFET so as to regulate the voltage drop to be constant.

16. The battery pack according to claim 10, wherein said controller circuit is activated by the electric energy supplied from said external power supply interface, said battery is substantially connected to a resistance element in series, said controller circuit measures voltage drop at said resistance element, and controls a voltage to be applied to the gate of said MOSFET so as to regulate the voltage drop to be constant.

17. The battery pack according to claim 11, wherein said controller circuit is activated by the electric energy supplied from said external power supply interface, said battery is substantially connected to a resistance element in series, said controller circuit measures voltage drop at said resistance element, and controls a voltage to be applied to the gate of said MOSFET so as to regulate the voltage drop to be constant.

18. The battery pack according to claim 12, wherein said controller circuit is activated by the electric energy supplied from said external power supply interface, said battery is substantially connected to a resistance element in series, said controller circuit measures voltage drop at said resistance element, and controls a voltage to be applied to the gate of said MOSFET so as to regulate the voltage drop to be constant.

19. A circuit for charging a battery for a portable terminal device comprising:

a controller which controls electric energy from a solar panel unit;

a transistor which is activated and inactivated under a control of said controller; and a current detector resistance element which detects electric current flowing through said battery, wherein said controller activates said transistor to supply electric currents to said battery and said current detector resistance element, and controls said transistor to be activated or inactivated so that a voltage between both ends of said current detector resistance element is regulated at a constant voltage, thus said battery is charged with the electric energy supplied to said controller, while said portable terminal device is resting, and said controller activates said transistor to supply the electric energy from said solar panel unit to said portable terminal device, and supplies the electric energy from said battery to said portable terminal device or charges said battery with part of the electric energy from said solar panel unit, in accordance with the amount of electric energy to be used by said portable terminal device, while said portable terminal device is in operation.

20. The circuit according to claim 19, wherein said transistor is connected to an interface which accepts an external power source, an anode of said battery, and said controller, and one end of said current detector resistance element is connected to a cathode of said battery and said controller, and the other end of said current detector resistance element is grounded.

\* \* \* \* \*